United States Patent [19]
Dougherty

[11] Patent Number: 5,962,584
[45] Date of Patent: Oct. 5, 1999

[54] WATERBORNE LATEX COMPOSITIONS HAVING REACTIVE PENDANT FUNCTIONAL GROUPS AND METHODS OF PREPARING THE SAME

[75] Inventor: Shawn Marie Dougherty, Gray, Tenn.

[73] Assignee: Eastman Chemical Company, Kingsport, Tenn.

[21] Appl. No.: 08/906,660

[22] Filed: Aug. 7, 1997

Related U.S. Application Data

[60] Provisional application No. 60/030,169, Oct. 31, 1996.

[51] Int. Cl.$^6$ ..................................................... C08L 33/26
[52] U.S. Cl. ............................................................ 524/827
[58] Field of Search ............................................. 524/827

[56] References Cited

U.S. PATENT DOCUMENTS

| | | | |
|---|---|---|---|
| 3,261,796 | 7/1966 | Simms | 260/29.6 |
| 3,929,744 | 12/1975 | Wright et al. | 260/80.73 |
| 4,301,257 | 11/1981 | Zengel et al. | |
| 5,268,417 | 12/1993 | Filges et al. | 524/714 |
| 5,539,073 | 7/1996 | Taylor et al. | 526/323 |

OTHER PUBLICATIONS

Robin W. Dexter, Robert Saxon, Denise E. Fiori, *m–TMI, A Novel Unsaturated Aliphatic Isocyanate*, American Cyanamid Company, Stamford, CT 06904, pp. 534–539.

Hiroo Tanaka and lars Odberg, *Preparation of Cationic Polyacrylamides by a Modified Hofmann Reaction: Fluorescent Labeling of Cationic Polyacrylamides*, Journal of Polymer.

Haruma Kawaguchi, Hirotomo Hoshino, Hajime Amagasa, Yasuji Ohtsuka, *Modifications of a Polymer Latex*, Journal of Colloid and Interface Science, vol. 97, No. 2, Feb., 1984, pp. 465–475.

A. M. Schiller, T. J. Suen, *Ionic Derivatives of Polyacrylamide*, Industrial and Engineering Chemistry, vol. 48, No. 12, Dec., 1956, pp. 2132–2137.

Patent Abstracts of Japan, vol. 007, No. 108 (C–165), May 11, 1983 & JP 58 029823 A (Dietsuku Haakiyuresu KK), Feb. 22, 1983, see abstract.

Patent Abstracts of Japan, vol. 016, No. 544 (C–1004), Nov. 13, 1992 & JP 04 202897 A (Mitsui Toatsu Chem Inc), Jul. 23, 1992, see abstract.

Database WPI, Section Ch, Week 9538, Derwent Publications Ltd., London, GB; Class A14, AN 95–290443 XP002055564 & JP 07 188 332 A (Mitsui Toatsu Chem Inc), Jul. 25, 1995, see abstract.

Kawaguchi et al, "Modifications of a Polymer Latex", J. Coll. Int. Sci., Feb. 1984.

Tanaka et al, Journal Polymer Sci, 1989.

Schiller et al, Ind. Eng. Chem., 1956.

*Primary Examiner*—Edward J. Cain
*Attorney, Agent, or Firm*—Rose M. Allen; Harry J. Gwinnell

[57] ABSTRACT

The present invention provides waterborne reactive functional latex compositions having pendant reactive functional groups. The reactive functional latex is formed by free-radical emulsion polymerization of monoethylenically unsaturated monomers containing at least one amide functionality with other copolymerizable monoethylenically unsaturated monomers. The amide functionality on the latex polymer is transformed into an isocyanate and/or amine functionality by addition of an alkali hypohalide. The isocyanate and/or amine groups are subsequently react with a multifunctional additive having at least one functional group suitable for reaction with an isocyanate or amine group and attachment of the additive to the polymer particle, and another functional group that remains pendant.

20 Claims, No Drawings

5,962,584

WATERBORNE LATEX COMPOSITIONS HAVING REACTIVE PENDANT FUNCTIONAL GROUPS AND METHODS OF PREPARING THE SAME

This application claims benefit of Provisional Application No. 60/030,167, filed Oct. 31, 1996.

BACKGROUND OF THE INVENTION

1. Field of the Invention

This invention relates to waterborne reactive functional latex compositions containing pendant reactive functional groups which can undergo crosslinking. The reactive functional latex compositions are suitable for use in a variety of applications such as ultraviolet curing coatings; coatings with good wet-adhesion, block resistance and good tensile properties; as rheology modifiers, pigment binders, corrosion resistant coatings and the like.

2. Description of the Related Art

U.S. Pat. No. 5,268,417, discloses an aqueous dispersion of a copolymer obtained by free-radical polymerization and containing at least one aldehyde or keto group; the dispersion contains at least one polyisocyanate in which the isocynate groups are blocked with oxime. However, the dispersions of the reference present the disadvantage of emitting volatile organic compounds (VOC) upon deblocking of the isocyanate group.

U.S. Pat. No. 3,261,796 refers to modifying a carboxylic acid-containing latex with aziridine to produce amine groups on the polymer backbone. However, this reference exhibits the disadvantage of using toxic aziridine chemistry.

The publication by A. M. Schiller, et al, "Ionic Derivatives of Polyacrylamide", Industrial and Engineering Chemistry, 2132–2137, Vol 48 (1956), refers to a polyacrylamide made in an aqueous solution by free-radical polymerization which was subsequently transformed into sulfomethylated polyacrylamide in an aqueous solution. The reference further refers to a way of converting polyacrylamide into a cationic derivative or a polymer containing basic groups. This was achieved by reacting the aqueous solution of polyacrylamide with hypobromide or hypochloride and isolating the polymer by neutralization with HCl and subsequent precipitation by salting-out effect. The salting-out was facilitated by the presence of the large concentration of sodium carbonate and sodium chloride.

Kawaguchi, et al, Journal of Colloid and Interface Science, Vol. 97, 465–475 (1984), refers to a monodisperse styrene-acrylamide copolymer latex prepared by an emulsifier-free aqueous polymerization and subsequent modification of the latex to obtain a series of polymer latexes having the same particle size but different kinds and different amounts of functional groups on their surface. Thus, the amide groups were converted to COOH by hydrolysis, to OH-containing groups by reaction with HCHO, to $NH_2$ by the Hofmann reaction, to $NR_2$ by the Mannich reaction, and to $SO_3$-containing groups by the treatment with $NaHSO_3$.

Tanaka et al, Journal of Polymer Science: Part A: Polymer Chemistry, Vol. 27, 4329–4339 (1989), refers to cationic polyacrylamides which contain both primary and quaternary amines, which were prepared according to a Hofmann reaction by adding choline chloride to a solution of polyacrylamide in water. The polymer solutions of the reference are used as flocculants. The polyacrylamide of the reference was synthesized by aqueous solution polymerization of acrylamide with potassium persulfate-isopropanol redox initiator. Sodium hypochloride solution was prepared by passing chlorine gas through a sodium hydroxide solution. The aqueous solution of the sodium hydrochloride prepared above was mixed with an aqueous solution of polyacrylamide to form primary and quaternary amines.

U.S. Pat. No. 5,539,073 to Taylor et al, refers to polymers useful in coating compositions, prepared by a free radical polymerization. The polymers of the reference possess pendant allylic groups which are capable of effecting free-radical flux when the compositions are applied to a substrate and exposed to oxygen.

The publication by R. W. Dexter, et al, "m-TMI, a novel unsaturated aliphatic isocyanate", Polymer Material Science and Engineering, 534–539, Vol. 53 (1985), refers to the use of α,α-dimethyl-meta-isopropanol benzyl isocyanate (m-TMI available from American Cyanamid Company). The incorporation of the pendant functionality is accomplished by reaction of m-TMI via copolymerization to introduce pendant aliphatic isocyanate, or via post-reaction of m-TMI with a polymer containing hydroxyl, —NH or —SH groups on the backbone to introduce pendant unsaturation on the backbone of the polymer. The authors indicate that this material has the ability to undergo copolymerization in aqueous emulsion systems with minimal hydrolysis of the isocyanate functionality. The low reactivity of this highly hindered isocyanate is also discussed. However, m-TMI is an expensive monomer.

Thus, there exists a need for waterborne latex compositions having pendant reactive functional groups. The functional latexes should be able to enhance properties of the latex without requiring the use of blocked isocyanates that need to be deblocked in a separate step after latex synthesis; not require the use of crosslinking chemistry that results in the release of protective groups that create environmentally undesirable or toxic volatile organic compounds (VOC) such as formaldehyde or methanol; and not require excessive high heating or addition of acid or heavy metal catalysts. Further, there exists a need for low temperature or ultraviolet light (UV) crosslinkable latexes having the crosslinking functionality on the surface of the latex particles rather than randomly distributed throughout the latex particles and not readily available for crosslinking. There is also a need for methods to introduce reactive functionality onto latex particles subsequent to particle formation, especially functional groups that cannot remain unreactive during latex polymerization.

It is an object of the present invention to provide waterborne latex compositions having pendant reactive functional groups. The latex compositions are suitable for coatings applications; do not generate undesirable VOC side products; and contain low levels of amide functionality.

It is another object of the present invention to provide crosslinkable waterborne latex compositions exhibiting superior tensile properties and chemical resistance properties.

It is a further object of the present invention to provide methods for preparing waterborne latex polymers having pendant reactive functional groups.

SUMMARY OF THE INVENTION

Applicant has discovered novel waterborne reactive functional latex compositions having pendant reactive functional groups. The pendant reactive functional groups are able to crosslink during film formation and form crosslinked films which exhibit good tensile properties and chemical resistance properties suitable for use in coatings applications and adhesives among others. In addition, Applicant has discovered novel methods for the preparation of waterborne reactive functional latex compositions having pendant reactive functional groups.

The waterborne reactive functional latex compositions of the present invention are formed by copolymerization of: (a) a monoethylenically unsaturated monomer containing at least one amide functionality; and (b) an additional copolymerizable monoethylenically unsaturated monomer. The amide functionality on the latex polymer particle is subsequently transformed into isocyanate and/or amine functionalities, preferably by addition of an alkali hypohalide. The thus formed isocyanate or amine group on the polymer is further reacted with (c) a multifunctional additive. The multifunctional additive should have at least one functionality suitable for reaction with an isocyanate or amine functionality, and at least one other functionality that remains pendant on the polymer backbone.

The thus formed isocyanate or amine group on the polymer is further reacted with (c) a multifunctional additive having at least one functionality suitable for reaction with an isocyanate or amine group and at least one other functionality that remains pendant on the polymer backbone. The above transformation may be depicted by Scheme I below.

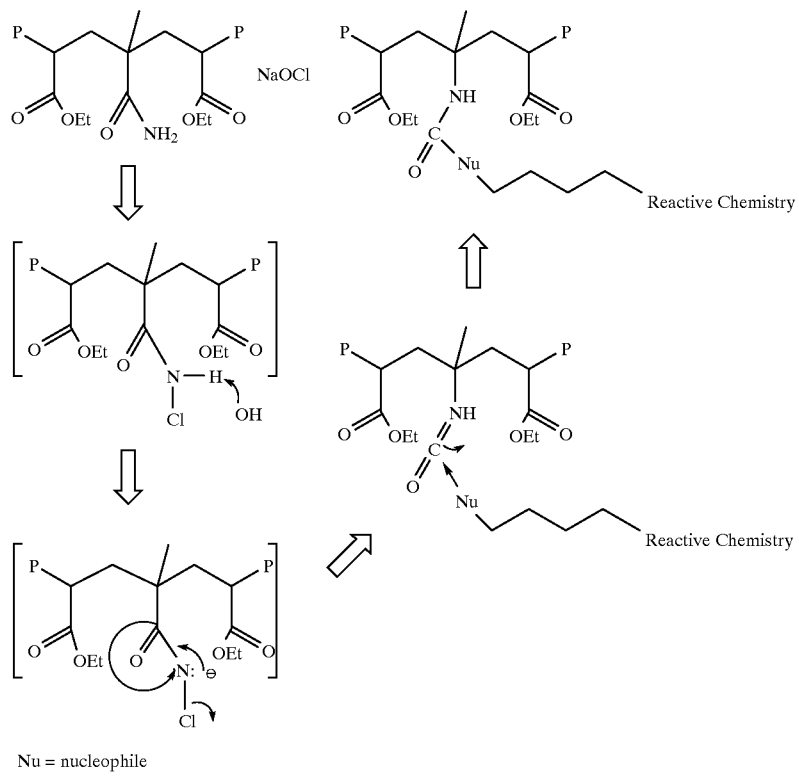

Scheme I
AN EAMPLE OF A MULTIFUNCIONAL GROUP BEING ADDED TO A REACTIVE-FUNCTIONAL LATEX Nu = nucleophile

DESCRIPTION OF THE PREFERRED EMBODIMENTS

The present invention provides reactive functional latex formed by free-radical emulsion polymerization of (a) a monoethylenically unsaturated monomer containing at least one amide group, and (b) an additional copolymerizable monoethylenically unsaturated monomer. The amide functionality on the latex particle is subsequently transformed into an isocyanate or amine group, preferably by addition of an alkali hypohalide or other compound capable of transforming an amide group to an isocyanate or amine group.

Although not wishing to be bound by any particular theory, it is believed that the amide functional group of the latex polymer is located substantially on the surface of the latex particle and is thereby readily available for reaction to form an isocyanate or amine group.

Preparation of the Latex Polymer with Amide Functionality a) Monoethylenically Unsaturated Monomer Containing at least one Amide Functional Group Any monomer or macromonomer containing an amide functional group and being able to homo- or co-polymerize in an emulsion polymerization process is suitable for use in the present invention. The term "macromonomer" refers to a macromolecule having at least one polymerizable site. Further, a "macromolecule" is a large molecule containing a large number of monomeric units. Preferred monomers are commercially available monomers such as acrylamide and methacrylamide. The monoethylenically unsaturated monomer containing at least one amide group is typically present in an amount of from 0.05 to 30.0 wt %, based on the total amount of monoethylenically unsaturated monomers. A more preferred amount for the monoethylenically unsaturated monomer containing an amide group is 2.0 to 15.0 wt %, while the most preferred amount is from 3.0 to8.0wt %.
(b) Copolyerizable Monoethylenically Unsaturated Monomer Suitable copolymerizable monoethylenically unsaturated monomers for the preparation of reactive functional latex polymers include, but are not limited to, monoethylenically unsaturated monomers represented by the general formula:

$$CH_2=C(R^1)\ COOR^2 \qquad (I)$$

where $R^1$ is hydrogen or a $C_1$–$C_3$ alkyl group, and $R^2$ is a $C_1$–$C_{20}$ alkyl group, phenyl, benzyl, hydroxy-($C_1$–$C_4$)-alkyl, $C_1$–$C_4$ alkoxy-($C_1$–$C_4$) alkyl, cyclopentyl, cyclohexyl, furyl, $C_1$–$C_4$ alkyl furyl, tetrahydrofuryl, $C_1$–$C_4$ alkyl tetrahydrofuryl and combinations of these monomers thereof. Combinations of monomers where $R^1$ is hydrogen and monomers where $R^1$ is an alkyl group are used to modify the glass transition temperature (Tg) of the vinyl polymer.

Preferred examples of these type comonomers are, but not limited to, methyl (meth)acrylate, ethyl(meth)acrylate, propyl(meth)acrylate, isopropyl(meth)acrylate, butyl(meth)acrylate, isobutyl(meth)acrylate, hexyl(meth)acrylate, isooctyl(meth)acrylate, isodecyl(meth)acrylate, lauryl (meth)acrylate, stearyl(meth)acrylate, phenoxyethyl(meth)acrylate, methoxyethyl(meth)acrylate, benzyl(meth)acrylate, ethoxyethyl(meth)acrylate, 2-ethylhexyl(meth)acrylate, cyclopentyl (meth)acrylate and isobornyl (meth)acrylate, as well as combinations of those monomers thereof. The term "alkyl" is used to denote straight chain or branched alkyl groups. Further, the term "(meth)acrylate" is used throughout this application to denote either acrylates or methacrylates. A combination of these monomers may be used in order to achieve the desired Tg for the latex polymer. Acrylic and methacrylic acid esters having a $C_1$–$C_{20}$ alcohol moiety are commercially available or can be prepared by known esterification processes. In addition, acrylic and methacrylic acid esters may contain additional functional groups, such as, hydroxyl, amine, halogen, ether, carboxylic acid, nitrile, and alkyl group. Preferred (meth)acrylate esters include methyl (meth)acrylate, ethyl(meth)acrylate, butyl (meth)acrylate, ethylhexyl(meth)acrylate, and isobornyl methacrylate.

Other suitable copolymerizable monoethylenically unsaturated monomers include styrenic monomers. Styrenic monomers denotes styrene or substituted styrenes such as $C_1$–$C_6$ alkyl ring-substituted styrene; $C_1$–$C_3$ alkyl α-substituted styrene; or a combination of ring and α-alkyl substituted styrene. Preferred styrenic copolymerizable monomers include styrene, p-methyl styrene, o-methyl styrene, p-butyl styrene, α-methyl styrene and combinations thereof.

Additional suitable copolymerizable monoethylenically unsaturated monomers are those represented by the general formula:

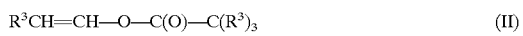

$$R^3CH=CH-O-C(O)-C(R^3)_3 \qquad (II)$$

wherein $R^3$ is independently hydrogen or an alkyl group of up to 12 carbon atoms. Particular useful vinyl monomers of formula (II) include: $CH_2=CH-O-C(O)-CH_3$, $CH_2=CH-O-C(O)-C(CH_3)_3$, $CH_2=CH-O-(O)-CH(C_2H_5)(C_4H_9)$, and $CH_2=CH-O-C(O)-CH_2CH_3$.

Vinyl alcohols also represent a suitable class of copolymerizable monomers, in accordance with the present invention.

In a preferred embodiment of the present invention, a copolymerizable monomer known to promote wet adhesion may be used as component (b). Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate and N-(2-methacryloyloxyethyl) ethylene urea.

In another preferred embodiment, at least one ethylenically unsaturated copolymerizable surfactant may be employed. Copolymerizable surfactants possessing isopropenyl phenyl or allyl groups are preferred. Copolymerizable surfactants may be anionic surfactants, such as those containing a sulfate or sulfonate group, or nonionic surfactants. Other copolymerizable surfactants include those containing polyoxyethylene alkyl phenyl ether moieties and sodium alkyl allyl sulfosuccinate.

In general, components (a) and (b) may be polymerized by conventional free-radical initiated emulsion polymerization techniques. The polymerization can be initiated by a water-soluble or water-dispersible free-radical initiator, optionally in combination with a reducing agent, at an appropriate temperature. The polymerization of the monomers may be conducted batch wise, semi-batch or in a continuous mode.

Although a surfactant-free latex can be prepared in accordance with the present invention, a conventional surfactant or a combination of surfactants may be used such as anionic or non-ionic emulsifiers. Examples of preferred surfactants include, but are not limited to, alkali or ammonium alkylsulfates, alkylsulfonic acids, fatty acids, oxyethylated alkylphenols, or any combination of anionic or non-ionic surfactant. An additional preferred surfactant is HITENOL HS-20, a polyoxyethylene alkylphenyl ether ammonium sulfate, available from DKS International, Inc., Japan. A list of useful surfactants is available in the treatise: McCutcheon's Emulsifiers & Detergents, North American Edition and International Edition, MC Publishing Co., Glen Rock, N.J., 1993. The amount of surfactant used is typically up to 6 wt %, based on the total weight of the monomers.

Water-dispersible and water-soluble polymers may also be employed as surfactants or stabilizers in the polymerization process. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, all of which are incorporated herein by reference. Surfactants and stabilizers may be used during the polymerization to control, for example, particle nucleation and growth, particle size and stability or they may be post added to enhance stability of the latex or modify other properties of the latex such as surface tension, wetability and the like.

Useful initiators include any conventional free-radical initiators such as hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like. The amount of initiator is typically between 0.05 to 6.0 wt %, based on the total weight of the monomers. A free-radical initiator may be combined with a reducing agent to form a redox initiating system.

Suitable reducing agents are those which increase the rate of polymerization and may include, for example, sodium bisulfide, sodium hydrosulfide, sodium formaldehyde-sulfoxylate, ascorbic acid, isoascorbic acid and mixtures thereof. The redox initiating system can be used at similar levels as the free-radical initiators.

In combination with the above reducing agents, polymerization catalysts may also be used. Polymerization catalysts are those compounds which increase the rate of polymerization by promoting decomposition of the free-radical initiator in combination with the reducing agent at the reaction conditions. Suitable catalysts include transition metal compounds such as ferrous sulfate heptahydrate ($FeSO_4$ $7H_2O$), ferrous chloride, cupric sulfate, cupric chloride, cobalt acetate, cobaltous sulfate, and mixtures thereof Low levels of chain transfer agents may also be used in accordance with the present invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, such as carbon tetrabromide and bromodichloromethane and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

A preferred molecular weight range for the latex polymers is a weight average molecular weight (Mw) of from 1,000 to 8,000,000, as determined by gel permeation chromatography (GPC). A more preferred range for the weight average molecular weight is from 5,000 to 500,000.

A preferred particle size for the latex polymers is from 0.01 to $3.0\mu$. In a preferred embodiment of the present invention the particle size of a dispersion formed by emulsion polymerization may range from about 0.05 to about $1.5\mu$. A more preferred range is 0.1 to $1.0\mu$. The polymer particles generally have a spherical shape. In one embodiment in accordance with the present invention, the spherical polymer particle has a core portion and a shell portion or a gradient structure. The core/shell polymer particles may also be prepared in a multi-lobe form, a peanut shell, an acorn form, a raspberry form or any other form. Further, the shell of a core/shell particle may fully or partially cover the core of the particle. It is further preferred, wherein particles have a core/shell structure that the core portion comprises about 20 to about 80 wt % of the total weight of the particle, and the shell portion comprises about 80 to about 20 wt % of the total weight of the particle.

The glass transition temperature (Tg) of the latex polymer in accordance with the present invention, may be up to about 100° C. In a preferred embodiment of the present invention, where film forming at ambient temperatures of the particles is desirable, the glass transition temperature may preferably be under 60° C.

Transformation of Amide Groups

The latex polymers having amide functionality are further reacted in the presence of a compound that transforms the amide functionality into an isocyanate or amine functionality, such as shown in Scheme I above. Preferably, this transformation occurs as a Hoffman-type rearrangement. Preferred reagents for initiation of this transformation are, but are not limited to, alkali hypohalides such as, alkali hypochlorite or alkali hypobromite. More preferred are sodium hypochlorite, NaOCl and sodium hypobromite, NaOBr. The preferred amount of the alkali hypohalide reagent is 0.1 to 1.0 molar equivalent based on the amide functionality. In the case of alkali hypochlorite, the amount of alkali hypochlorite is calculated based on available chlorine, as determined by titration using ASTM test method D2022-89, "Test Methods of Sampling and Chemical Analysis of Chlorine-Containing Bleaches."

Optional additives may also be used to control the transformation of amide groups to isocyanate and/or amine groups. Preferred optional additives include a base, such as an alkali hydroxide. The addition of alkali hydroxide facilitates formation of a higher amount of amine functionality versus isocyanate functionality. The relative amounts of alkali hypohalide and alkali hydroxide may be used to produce the desired functionality. The preferred alkali moiety is sodium or potassium, present in an amount of up to 3.0 molar equivalents based on said amide group.

Because sodium chloride and sodium hydroxide may be present as by-products of this addition step, the latex may optionally be dialyzed either just after addition of the alkali hypohalide or just after addition of the multifunctional additive, for as long as necessary if these salts cannot be accommodated in the final latex. In addition, the pH of the latex after addition of the alkali hypohalide may be too high and thus destroy the reactivity of many useful multifunctional additives. If this is the case, the pH may be adjusted by means known in the art, including but not limited to, bubbling $CO_2$ through the latex, passing the latex through an ion exchange column, adding a buffer system, or adding acids.

(c) Multifunctional Additive

The term "multifunctional" is used to denote an additive with at least two functional groups. The multifunctional additive should contain one group suitable for reaction with the isocyanate or amine group formed on the polymer particle and attachment of the multifunctional group to the latex polymer; and at least one other functional group that remains pendant.

In the case where an isocyanate is present on the polymer particle, any multifunctional compound having a nucleophilic functional group and a second functional group can attach to the latex particle by reaction with the isocyanate permitting the second functional group of the multifunctional compound to remain pendant. The second functional group of the multifunctional compound may be a non-nucleophile or a less reactive nucleophile than the nucleophilic moiety with which the multifunctional compound is attached to the polymer backbone. In the case where the second functional group is a less reactive nucleophile, it is preferred that the nucleophile functional group that attaches to the isocyanate be present in substantially equimolar amounts with the isocyanate group present on the polymer backbone, to ensure that the second reactive functional moiety on the multifunctional additive remains pendant. Exemplified nucleophiles include a hydroxyl group, a thiol group, an amine group, a carboxyl group, an azide group, a nitrate group, a sulfate group or a silane group. The reaction of the nucleophilic group of the multifunctional additive with the isocyanate group may further be facilitated by the presence of an acylation catalyst such as 4-dimethylamino pyridine.

Multifunctional compounds that can attach to amine groups formed on the polymer particles include any multifunctional compound having an electrophilic functional group such as an acyl group, a sulfonate group, an acetoacetoxy group or an epoxy group. When the multifunctional compound includes another group that is either not reactive with the amine group or a less reactive group, as in the case discussed for the isocyanate above, the second functional group will remain pendant.

By way of example, such multifunctional additives include, but are not limited to, (meth)acryloyl halide, glycidyl(meth)acrylate; aminopropyl trimethoxysilane, hydroxyalkyl (meth)acrylates such as hydroxyethyl(meth) acrylate and hydroxypropyl(meth)acrylate, vinyl benzyl alcohol, diallyl amine, distilled oleylamine, acetoacetoxyethyl methacrylate, neopentylglycol bisacetoacetate, methyl acetoacetate or mixtures thereof. The multifunctional additive may be present in an amount of up to 1.0 equivalent based on the amount of amide group.

The reactive functional latex compositions prepared as described above are useful as ultraviolet curing coatings, coatings with good wet-adhesion, block resistance and good tensile properties, rheology modifiers, pigment binders, corrosion resistant coatings and the like.

Having generally described this invention, a further understanding can be obtained by reference to certain specific examples which are provided herein for purpose of illustration only and are not intended to be limiting unless otherwise specified.

EXAMPLES

Example 1

Preparation of a vinyl latex polymer

All reactions were carried out under an atmosphere of nitrogen in a glass jacketed vessel with stirring at 400 rpm. Water (950 mL), sodium bicarbonate (0.979 g), and sodium dodecyl sulfate (SDS, 0.55 g) was added to a jacketed glass reactor vessel and heated to 80° C. In the meantime, methyl methacrylate (MMA, 776.3 g) and butyl acrylate (BA, 1116 g) were combined and 10% of this mixture (189.2 g) was set aside. Also methacrylamide (MAAM, 91.2 g) and SDS (1.9 g) were dissolved in water (650 g) and 10% of this solution (74.3 g) was added to the reactor vessel at 80° C. along with the 10% of the MMA and BA monomer portion (189.2 g) and potassium persulfate (10.7 g). The two monomer flasks were combined and after the reaction vessel had heated 30 minutes at 80° C., feeding of the monomer mixture began at 14.8 g/min. The catalyst feed was started 75 minutes after the monomer feed at (0.954 g/min). The catalyst consisted of water (103 g) and potassium persulfate (1.8 g). After all the catalyst was in, the reaction was allowed to heat an additional 30 minutes and was then cooled to 60° C. Isoascorbic acid (4.0 g) was added followed by ferrous ammonium sulfate (31 mg), and ethylenediamine tetraacetic acid (EDTA, 25 mg) dissolved in water (4 mL). Finally, t-butylhydroperoxide (70%, 0.40 g) was added directly to the vessel and a mixture of t-butylhydroperoxide (70%, 1.18 g) in water (39 mL) was added over 30 minutes. The resulting latex had an effective diameter of 229 nm, a poly dispersity of 0.016 nm, and was 52% solids with less than 500 ppm total trace monomer.

The latex from Example 1 was used for attachment of a reactive functional group to the latex particles by transformation of the amide group to isocyanate and/or amine groups, followed by further reaction with a multifunctional additive. The multifunctional additives used in Examples 2 through 10 are described in Table I below:

TABLE I

| Example | Multifunctional Additive |
|---------|--------------------------|
| Example 2 | gamma aminopropyl trimethoxysilane (A1110) |
| Example 3 | hydroxypropyl methacrylate (HPMA) |
| Example 4 | vinylbenzyl alcohol (VBA) |
| Example 5 | Diallylamine (DAA) |
| Example 6 | distilled oleyl amine with 75% oleyl units, 20% stearyl units and 5% of a $C_{16}$ amine (ADOGEN 172D) |
| Example 7 | acetoacetoxyethyl methacrylate (AAEM) |
| Example 8 | hydroxyethyl methacrylate (HEMA) |
| Example 9 | neopentylglycol bisacetoacetate (NPG-bisAA) |
| Example 10 | methyl acetoacetate (AAMe) |

Example 2

Sodium hypochlorite (NaOCl, 81.3 g) with 9.44% available chlorine was added slowly to 750 mL of latex (Example 1) with stirring. After 20 minutes a mixture A1110 (15.5 g), TERGITOL NP-10 surfactant (0.077 g), sodium dioctyl sulfosuccinate (1.5 mg) in a 5% solution of TERGITOL NP-40 surfactant (32.5 mL) was added with stirring. In addition a hyper-nucleophilic acylation catalyst, 4-dimethyl aminopyridine (4-DMAP, 200 mg), was added just prior to the multifunctional pendant group to facilitate latex functionalization. This product gave significant increase in crosslink density.

Example 3

Sodium hypochlorite (NaOCl, 81.3 g) with 9.44% available chlorine was added slowly to 750 mL of latex (Example 1) with stirring. After 20 minutes a mixture of HPMA (31.1 g), TERGITOL NP-10 surfactant (1.56 g), sodium dioctyl sulfosuccinate (3.1 mg) in a 5% solution of TERGITOL NP-40 surfactant (65.4 mL) was added with stirring. Finally 4-DMAP (200 mg) was added to the latex to facilitate latex functionalization.

Example 4

Sodium hypochlorite (NaOCl, 81.3 g) with 9.44% available chlorine was added slowly to 750 mL of latex (Example 1) with stirring. After 20 minutes a mixture of VBA (23.2 g), TERGITOL NP-10 surfactant (1.16 g), sodium dioctyl sulfosuccinate (2.3 mg) in a 5% solution of TERGITOL NP-40 surfactant (48.7 mL) was added with stirring. Finally 4-DMAP (200 mg) was added to the latex to facilitate latex functionalization.

Example 5

Sodium hypochlorite (NaOCl, 81.3 g) with 9.44% available chlorine was added slowly to 750 mL of latex (Example 1) with stirring. After 20 minutes a mixture of DAA (21.0 g), TERGITOL NP-10 surfactant (1.05 g), sodium dioctyl sulfosuccinate (2.1 mg) in a 5% solution TERGITOL NP-40 surfactant (44.1 mL) was added with stirring. Finally 4-DMAP (200 mg) was added to the latex to facilitate latex functionalization.

Example 6

Sodium hypochlorite (NaOCl, 81.2 g) with 9.44% available chlorine was added slowly to 750 mL of latex (Example 1) with stirring. After 20 minutes a mixture of ADOGEN 172D (46.1 g), TERGITOL NP-10 surfactant (2.3 g), sodium dioctyl sulfosuccinate (4.6 mg) in a 5% solution of TERGITOL NP-40 surfactant (96.8 mL) was added with stirring. Finally 4-DMAP (200 mL) was added to the latex to facilitate latex functionalization.

In Examples 2–6, the multifunctional additives having nucleophilic groups were added to the alkali hypochloride-treated latex in dialysis tubing as preemulsions. The preemulsions were made by adding 5 wt % of TERGITOL NP-10 surfactant and 0.01–0.02% AEROSOL OT surfactant to the nucleophile and then adding this to 5 wt % of TERGITOL NP-40 surfactant in water to get the best shear and smallest particle size. The ADOGEN 1720 dispersed best at 90° C. producing mean particle sizes of 380 nm. The smaller molecular weight species, particularly VBA and diallylamine did not make good preemulsions, but in order to keep the compositions similar, the same addition procedures were followed. A small portion of 4-DMAP, 0.1%, was added as a hypernucleophilic acylation catalyst to both the nucleophile and the dialysis liquid. The dialysis tubing was inverted and kneaded to insure good mixing. These five 50 g latex samples, Examples 2–6, were dialyzed against 4 liters of water for 12 hours and their solids levels dropped from 45–50% to 29–36%, below the 40% level preferred for analytical testing. To avoid this problem, the large scale samples were only dialyzed 2 hours during the alkali-hypochloride and nucleophile addition. The samples were otherwise prepared identically except that in the large scale samples mixing was notably poorer.

TABLE II

| | Crosslink Density ($10 \times E^{-4}$) moles/cm$^3$ | |
|---|---|---|
| | Undialysed | Dialysed |
| Example 2 | 120 | 54 |
| Example 3 | 2 | 2.2 |
| Example 4 | 9.8 | 2.1 |
| Example 5 | 4.9 | 1.9 |
| Example 6 | 6 | 1.4 |

Wet Adhesion Test Method:

This procedure tests the coatings adhesion to an aged, alkyd substrate under wet, scrubbing conditions. This procedure is described in "VYNATE™ (Union Carbide Chemicals and Plastics Corporation)—Vinyl Emulsion Vehicles for Semigloss Interior Architectural Coatings", M. J. Collins, et al., presented at the 19th Annual "Water-Borne High-Solids and Powder Coating Symposium", Feb. 26–28, 1992, New Orleans, La., USA.

A ten-mil drawdown of a commercial gloss alkyd paint is made on a "Leneta" scrub panel (adhesion varies from alkyd to alkyd—a Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 22° C./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten ml of five percent "LAVA™" soap slurry are added, and the Nylon scrub brush (WG 2000NB) is passed over the scored paint film area. Water is added as needed to keep the paint film wet (flooded). The number of cycles for complete removal of the film is noted.

TABLE III

| | Block Data (a) (0–10) | | Wet Adhesion (b) | |
|---|---|---|---|---|
| | (c) | (d) | (c) | (d) |
| Example 1 | 0 | 0 | 420 | 600 |
| Example 2 | | | 420 | 400 |
| Example 3 | 7 | 4 | 3000 | 3000 |
| Example 4 | 7 | 4 | 2200 | 1400 |
| Example 5 | 6 | 1 | 2300 | 380 |
| Example 6 | 5 | 9 | 480 | 420 |

(a) ASTM-4946 at 22° C., 7 day dry block, 0 is total failure.
(b) 15 day, 1–3000 scrubs to total failure over green alkyd primer.
(c) Paint made from 3 day old latex.
(d) Paint made from 10 day old latex.

Example 7

Sodium hypochlorite (NaOCl, 48.6 g) with 10.78% available chlorine was added slowly with stirring to 400 mL of a latex containing amide functionality (0.0853 moles), similar to the latex of Example 1. After 20 minutes the pH was reduced to 9.5 using $CO_2$ (gas). A mixture of AAEM (2.36 g), TERGITOL NP-6 surfactant (24 mg) and sodium dioctyl sulfosuccinate (2.3 mg) was added with stirring.

Example 8

Sodium hypochlorite (NaOCl, 48.6 g) with 10.78% available chlorine was added slowly with stirring to 400 mL of a latex containing amide functionality (0.0853 moles), similar to the latex of Example 1. After 20 minutes the pH was reduced to 9.5 using $CO_2$ (gas). A mixture of HEMA (1.43 g), TERGITOL NP-6 surfactant (24 mg) and sodium dioctyl sulfosuccinate (2.3 mg) was added with stirring.

Example 9

Sodium hypochlorite (NaOCl, 48.6 g) with 10.78% available chlorine was added slowly with stirring to 400 mL of a latex containing amide functionality (0.0853 moles), similar to the latex of Example 1. After 20 minutes the pH was reduced to 9.5 using $CO_2$ (gas). A mixture of NPG-bisAA (3.1 g), TERGITOL NP-6 surfactant (24 mg) and sodium dioctyl sulfosuccinate (2.3 mg) was added with stirring.

Example 10

Sodium hypochlorite (NaOCl, 48.6 g) with 10.78% available chlorine was added slowly with stirring to 400 mL of a latex containing amide functionality (0.0853 moles), similar to the latex of Example 1. After 20 minutes the pH was reduced to 9.5 using $CO_2$ (gas). A mixture of AAMe (1.26 g), TERGITOL NP-6 surfactant (24 mg) and sodium dioctyl sulfosuccinate (2.3 mg) was added with stirring Film Gel Fraction and Film Swell Ratio Test Method:

Film gel fraction (FGF) is obtained by determining the insoluble weight fraction of polymer in a dry film sample. Film swell ratio (FSR) is obtained by determining the ratio of ratio of the insoluble polymer weight fraction swollen in the selected solvent (by weight) to dry weight of the insoluble weight fraction in a dry film sample. Average values are determined from quadruplicate measurements with acetone as the solvent.

The procedure used was as follows: for each sample determination, a 4"×4" 325-mesh steel screen and a metal weighing boat are baked in a vacuum oven at 120° C. for 90 minutes, cooled 30 minutes over $P_2O_5$ and weighed (W1and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnight and then in a vacuum oven at 120° C. for 3 hours and cooled for 30 minutes in a desiccator over $P_2O_5$. The samples are weighed and the vacuum portion of the baking procedure is repeated until reproducible weights are obtained for the screen plus dry solids (W6) and the film sample in the aluminum boat (W7). Calculations were made by the equations shown below:

$$FGF=(W6-W1)/[(W4)*[(W7-W2)/W3]] \quad FSR=(W5-W1)/(W6-W1)$$

TABLE IV

|  | Gel Fraction | | Swell Ratio | |
| --- | --- | --- | --- | --- |
|  | Latex | Film (38° C.) | Latex | Film (38° C.) |
| Starting Latex | 65 | 60 | 22 | 21 |
| Example 7 | 80 | 84 | 11 | 5 |
| Example 8 | 79 | 85 | 11 | 5 |
| Example 9 | 79 | 86 | 11 | 4 |
| Example 10 | 77 | 83 | 11 | 5 |

As shown in the table above, examples 7–10 all show improved swell ratios relative to the starting latex.

Obviously, numerous modifications and variations of the present invention are possible in light of the above teachings. It is therefore to be understood that within the scope of the appended claims, the invention may be practiced otherwise than as specifically described herein.

What is claimed is:

1. A waterborne reactive functional latex composition comprising a reactive functional latex polymer formed by free-radical emulsion polymerization of (a) a monoethylenically unsaturated monomer containing at least one amide group, and (b) an additional copolymerizable monoethylenically unsaturated monomer, said amide group being transformed into isocyanate and/or amine groups; and (c) a multifunctional additive having at least one functionality suitable for reaction with said isocyanate or amine group and at least one functionality that remains pendant on the polymer backbone.

2. The waterborne reactive functional latex composition of claim 1 wherein (a) is a (meth)acrylamide.

3. The waterborne reactive functional waterborne composition of claim 1 wherein (a) is present in an amount of from 0.05 to 30.0 wt %, based on the total amount of monoethylenically unsaturated monomers.

4. The waterborne reactive functional latex composition of claim 1 wherein (a) is present in an amount of from 2.0 to 15.0 wt %, based on the total amount of monoethylenically unsaturated monomers.

5. The waterborne reactive functional latex composition of claim 1 wherein (a) is present in an amount of from 3.0 to 8.0 wt %, based on the total amount of monoethylenically unsaturated monomers.

6. The waterborne reactive functional latex composition of claim 1 wherein (c) is present in an amount of up to 1.0 equivalent based on the amount of amide group.

7. The waterborne reactive functional latex composition of claim 1 wherein (c) is selected from the group consisting of (meth)acryloyl halide, glycidyl(meth)acrylate, aminopropyl trimethoxysilane, hydroxyethyl (meth)acrylate, hydroxypropyl(meth)acrylate, vinyl benzyl alcohol, diallyl amine, distilled oleylamine, acetoacetoxyethyl methacrylate, neopentylglycol bisacetoacetate, methyl acetoacetate and mixtures thereof.

8. A waterborne reactive functional latex composition comprising a reactive functional latex polymer formed by free-radical emulsion polymerization of (a) a monoethylenically unsaturated monomer containing at least one amide group, and (b) an additional copolymerizable monoethylenically unsaturated monomer;

an alkali hypohalide added to transform said amide group into isocyanate and/or amine groups; and (c) a multifunctional additive having at least one functionality suitable for reaction with said isocyanate or amine group and at least one functionality that remains pendant on the polymer backbone.

9. A method for preparing a waterborne reactive functional latex polymer comprising steps of:

emulsion polymerizing (a) a monoethylenically unsaturated monomer containing at least one amide group, and (b) an additional copolymerizable monoethylenically unsaturated monomer;

transforming said amide group into isocyanate and/or amine groups by reaction with an alkali hypohalide, optionally, in the presence of a base; and reacting said isocyanate or amine group with (c) a multifunctional additive having at least one functional group suitable for reaction with said isocyanate or amine group and at least one functional group that remains pendant.

10. The method of claim 9 wherein (a) is present in an amount of from 0.05 to 30.0 wt %, based on the total amount of monoethylenically unsaturated monomers.

11. The method of claim 10 wherein (a) is present in an amount of from 2.0 to 15.0 wt %, based on the total amount of monoethylenically unsaturated monomers.

12. The method of claim 11 wherein (a) is present in an amount of from 3.0 to 8.0 wt %, based on the total amount of monoethylenically unsaturated monomers.

13. The method of claim 9 wherein (c) is present in an amount of up to 1.0 equivalent based on the amount of amide group.

14. The method of claim 9 wherein said alkali hypohalide is alkali hypochlorite or alkali hypobromite.

15. The method of claim 9 wherein said alkali hypohalide is present in an amount of from 0.1 to 1.0 molar equivalent based on said amide group.

16. The method of claim 9 wherein said alkali hypohalide is present in an amount of from 0.5 to 1.0 molar equivalent based on said amide group.

17. The method of claim 9 wherein said alkali hypohalide is added in the presence of a base.

18. The method of claim 17 wherein said base is an alkali hydroxide.

19. The method of claim 17 wherein said alkali hydroxide is present in an amount of up to 3.0 molar equivalents based on said amide group.

20. The method of claim 8 wherein (c) is selected from the group consisting of (meth)acryloyl halide, glycidyl (meth)acrylate, aminopropyl trimethoxysilane, hydroxyethyl (meth)acrylate, hydroxypropyl(meth)acrylate, vinyl benzyl alcohol, diallyl amine, distilled oleylamine, acetoacetoxyethyl methacrylate, neopentylglycol bisacetoacetate, methyl acetoacetate and mixtures thereof.

* * * * *